United States Patent [19]
Whittle et al.

[11] 4,099,830
[45] Jul. 11, 1978

[54] OPTICAL SYSTEMS INCLUDING POLYGONAL MIRRORS ROTATABLE ABOUT TWO AXES

[75] Inventors: Harry Reed Whittle, Wallingford; Brooke Armitage Ward, Goring, both of England

[73] Assignee: A. J. Bingley Limited, Bristol, England

[21] Appl. No.: 750,721

[22] Filed: Dec. 15, 1976

[51] Int. Cl.² .................. G02B 27/17; B23K 9/00
[52] U.S. Cl. .................... 350/6.8; 219/121 L
[58] Field of Search .............. 350/6, 7, 190; 219/121 L, 121 LM; 356/200, 238; 250/223, 572, 236

[56] References Cited
U.S. PATENT DOCUMENTS

| | | | |
|---|---|---|---|
| 2,429,331 | 10/1947 | Sachtleben | 356/200 |
| 3,264,480 | 8/1966 | Zuck et al. | 350/7 |
| 3,543,979 | 11/1970 | Grove et al. | 219/121 L |
| 3,632,955 | 1/1972 | Cruickshank | 350/190 |
| 3,750,189 | 7/1973 | Fleischer | 350/7 |
| 3,932,726 | 1/1976 | Veheyen et al. | 219/121 LM |
| 3,957,339 | 5/1976 | Engel | 350/6 |

OTHER PUBLICATIONS

*Welding Research Supp.*, "Laser Welding of Aerospace Structural Alloys," L. P. Earudlind et al., Mar. 1966, pp. 127-s to 134-s.

*Primary Examiner*—Jon W. Henry
*Attorney, Agent, or Firm*—Wenderoth, Lind & Ponack

[57] ABSTRACT

An optical system suitable for use in machining plastics sheet material using a laser, brings a beam radiant energy in to a line focus on the work piece. The work piece is moving, and the line focus is perpendicular to the direction of such movement. The focused beam is scanned across the work piece in a direction having a component in the direction of motion of the workpiece so that the line focus traverses the work piece in the direction of the line focus. A cylindrical element may be used to form the line focus and a rotating polygonal mirror may perform the scanning.

6 Claims, 8 Drawing Figures

ELEVATION

PLAN

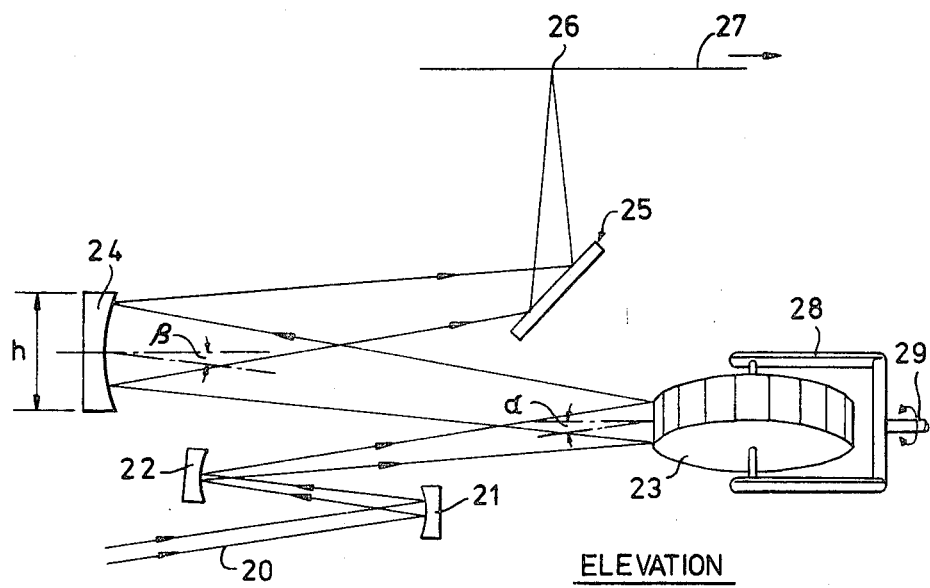
FIG. 4
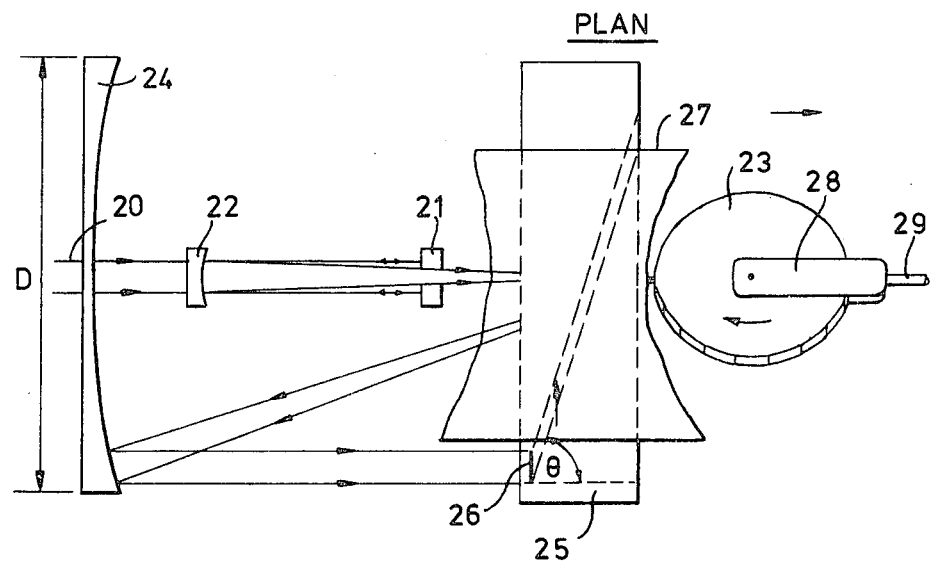

OPTICAL SYSTEMS INCLUDING POLYGONAL MIRRORS ROTATABLE ABOUT TWO AXES

BACKGROUND AND SUMMARY OF THE INVENTION

The present invention relates to optical systems, and more specifically, to optical systems for scanning a beam of radiant energy across a moving workpiece to be acted upon by the radiant energy.

According to the present invention, there is provided an optical system comprising means for bringing a beam of radiant energy to a line focus upon a moving workpiece to be acted upon by the radiant energy, the arrangement being such that the line focus is perpendicular to the direction of movement of the workpiece, and means for scanning the focused beam across the workpiece in a direction having a component in the direction of motion of the workpiece such that the line focus of the beam of radiant energy traverses the workpiece in a straight line in the direction of the line focus.

The means for bringing the beam of radiation to a line focus may comprise a cylindrical focusing element, a spherical transfer focusing element, and a final spherical focusing element. The means for scanning the focused beam across the workpiece may comprise a mirror positioned between the transfer element and the final spherical element and mounted for motion about an axis the orientation of which can be varied to alter the direction of scan of the focused beam.

If it is desired to use a beam of radiation to act upon a workpiece, it is often beneficial if the beam of radiation is brought to a line focus of limited length, rather than a point focus. In order to achieve a narrow interaction zone between the beam of radiation and the workpiece it then becomes necessary to scan the line focused beam of radiation across the workpiece in a straight line which is a continuation of the focal line. No problems arise in doing this if the workpiece is stationary, but if the workpiece is moving and it is required that the line of interaction should be perpendicular to the length of the workpiece, then it is necessary to scan the line focus of the beam across the workpiece in a direction such that the line focus has a component of velocity equal to the velocity of the moving workpiece. It is also necessary for the line focus to move so that its direction remains parallel to its original direction.

Both these criteria can be satisfied by bringing the beam to a line focus upon a rotating polygonal mirror which is arranged to scan the reflected beam across a large aperture final focusing element which re-forms the line focus of the beam upon the workpiece, and arranging that an appropriate angle exists between the axis of rotation of the mirror and the direction of the original line focus. To allow for variations in the velocity of the workpiece there should be provided means for varying the orientation of the axis of rotation of the mirror as a function of the rate of scan of the beam of radiation across the workpiece and the velocity of the workpiece. Alternatively the mirror can be a plane mirror which is made to oscillate or rotate about an axis which lies in the plane of its reflecting surface.

According to a preferred embodiment of the invention there is provided an optical system for scanning a beam of radiant energy across a moving workpiece to be acted upon by the radiant energy, comprising a cylindrical mirror arranged to bring the beam of radiation to an initial line focus, a polygonal mirror mounted for rotation about an axis, the orientation of which can be varied, and arranged to scan the beam of radiation across a spherical mirror which is positioned to reform the image of the line focus of the beam of radiation on the workpiece, and means for varying the orientation of the axis of the polygonal mirror as a function of the rate of scan of the beam of radiation across the workpiece and the velocity of the workpiece so that the line-focused image is perpendicular to the direction of motion of the workpiece and traverses the workpiece in a straight line in the direction of the line focus.

The optical system may also include means for causing more than one line focus to be formed. For example, there may be included a split plane mirror or a Fresnel biprism, or when the cylindrical focusing element is a cylindrical mirror, as in the preferred embodiment, the cylindrical mirror can be divided symmetrically about a longitudinal axis and the two halves may be displaced angularly so that an angle exists between the normals to the two parts of the mirror along their line of contact. Three parallel line foci can be produced by incorporating into the system a three-facet plane mirror.

If the workpiece is a strip of plastics material such as high density polythene, and it is to be cut, or welded, of if it is in tubular form, cut and welded to form sealed lengths, then a suitable source for the beam of radiation is a laser which emits radiation in the infra-red region of the spectrum, such as that form of laser which uses carbon dioxide gas as the lasing medium.

BRIEF DESCRIPTION OF THE DRAWINGS

The invention will now be described and explained further by way of example, with reference to the accompanying drawings, in which:

FIG. 4 shows in plan and elevation a mirror system embodying the invention.

DETAILED DESCRIPTION OF THE INVENTION

Figure 1:
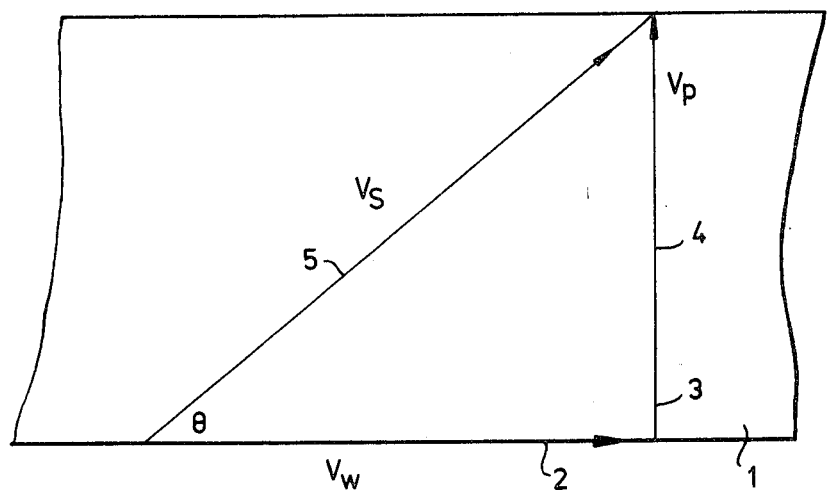
FIG. 1 is a vector diagram illustrating the principle of the invention.

Referring to the drawings, FIG. 1 shows a vector diagram illustrating the principle of the invention. If a workpiece 1 is moving in the direction of the arrow 2 with a velocity $\bar{v}_w$, and it is desired to make a line focus 3 of a beam of radiation (not shown) travel across the workpiece in a straight line 4 perpendicular to the direction of motion of the workpiece 1, and forming a continuation of the direction of the line focus 3 then the following vector relation must be true $$\bar{v}_s = \bar{v}_w + \bar{v}_p$$

where $\bar{v}_s$ is the actual scanning velocity of the line focus 3 across the workpiece and $\bar{v}_p$ is the effective velocity of scan of the line focus 3 across the workpiece 1. The angle which the actual direction of scan 5 of the line focus 3 makes with the direction of motion of the workpiece is given by $\theta \cos^{-1} v_w/v_s$. The angle $\theta$ is referred to herein as the "skew angle".

Figure 2:
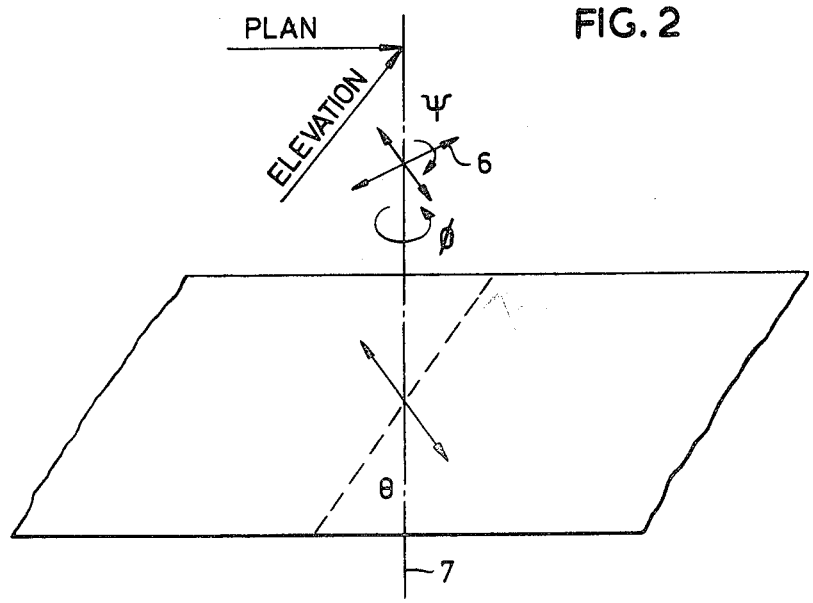
FIG. 2 illustrates the optical geometry of two embodiments of the invention described with reference to FIGS. 3 and 4.

These requirements can be met in an optical system in which a cylindrical lens or mirror is used to bring the beam of radiation to a line focus at or near a deflecting mirror, which is arranged to rotate or oscillate about an axis, to scan the beam of radiation across a workpiece in a direction related to that of the axis of motion of the mirror. In these circumstances, the orientation of the line focus after reflection from the mirror will not be affected by the orientation of the axis of motion of the deflecting mirror relative to that of the cylindrical lens or mirror, but the line focused image will be scanned by the motion of the deflecting mirror. The general geometrical arrangement is shown in FIG. 2 in which those features referred to in FIG. 1 have the same reference numerals. The symbol $\phi$ represents the ability to rotate the axis 6 of motion of the deflecting mirror (not shown) around the optic axis 7 of the optical system to set the direction of scan 5, and $\psi$ represents the movement of the deflecting mirror to effect the scan of the beam of radiation across the workpiece 1.

Figure 3:
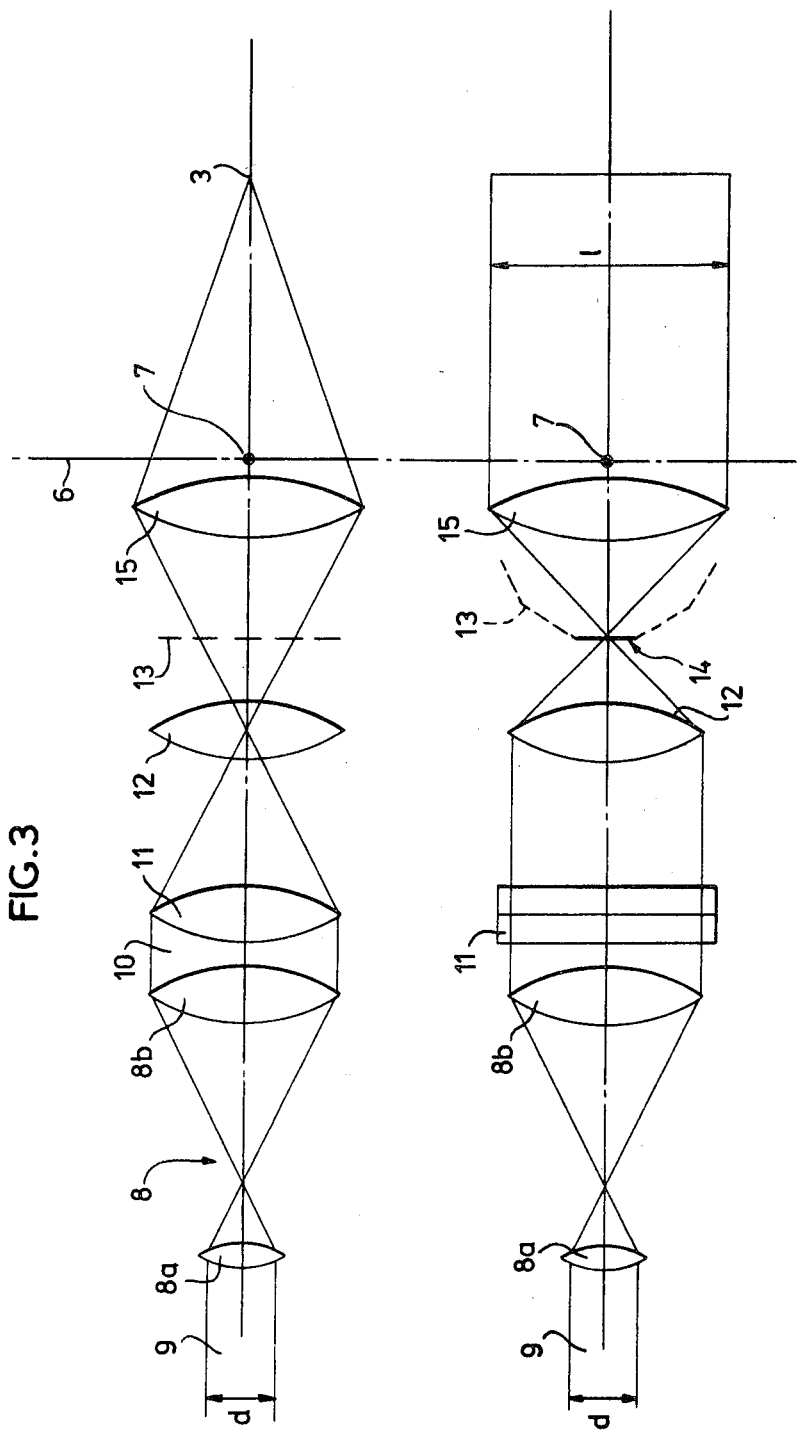
FIG. 3 shows in plan and elevation a schematic lens system embodying the invention.

Referring to FIG. 3, an optical system for producing a line focus of a beam of radiant energy and scanning it across a moving workpiece to be acted upon by the radiation in such a manner that the line focus traverses the workpiece in a straight line perpendicular to the direction of motion of the workpiece, comprises a beam expander indicated generally by the numeral 8 and consisting of two lenses 8a and 8b which receives a beam of radiation 9 from a laser source which is not shown, and produces a parallel beam of light 10 the diameter of which controls the dimensions of the final line focus of the beam of light. The expanded beam of light 10 passes through a cylindrical lens 11 and a transfer lens 12 which combine to form a line focused image at or near a rotating deflecting mirror 13 in the form of a regular polygon. The axis 6 of the mirror 13 is so mounted that the orientation can be varied in a manner which has been described, so as to vary the direction of scan of the final line focus 3 of the beam 10 across a moving workpiece 1 so that the line focus 3 traverses the workpiece in a straight line at right angles to the direction of motion of the workpiece. The axis of rotation 6 of the mirror 13 passes through the optic axis 7 of the optical system. The rotation of the mirror 13 scans the light reflected in turn from each of the facets 14 of the mirror 13 across a final spherical lens 15 which forms the final line focus 3 on the workpiece. In practice the lens 11 and the image 7 would be situated to the left of the mirror 6, but for simplicity the optical system is laid out in a straight line.

In elevation, the beam 9 is brought to a focus on the workpiece 1 by the lenses 11 and 15. In plan, the unfocused output from the lens 11 is applied to the lens 12 and is focused at or near the appropriate facet 14 of the deflecting mirror 13, and thence to the lens 15 which brings it to the line focus 3. The skew angle $\theta$ of the direction of scan 4 of the line focus 3 across the workpiece relative to the direction of motion of the workpiece 1 is set by the orientation angle $\phi$ of the axis of rotation 6 of the mirror 13 about the optic axis 7 of the optical system, relative to the longitudinal axis of the cylindrical lens 11.

FIG. 4 shows a mirror system for achieving the same purpose. Referring to FIG 4, in elevation a beam 20 of radiation from a laser source after passing through a beam expander, (neither the laser nor beam expander is illustrated) is incident upon a cylindrical mirror 21. The mirror 21 is arranged to bring the beam 20 to a line focus at or near the surface of a spherical mirror 22. The mirror 22 reflects the beam 20 onto a rotating polygonal mirror 23 corresponding to the mirror 13 in the previously described embodiment. The rotating mirror 23 scans the beam 20 across the surface of a final spherical mirror 24 whence it is reflected onto a plane mirror 25, brought to a final line focus 26 upon a moving workpiece 27 and scanned across the workpiece 27. In plan the beam 20 is focused at or near the polygonal mirror 23 by the spherical mirror 22. The beam 20 is scanned across the mirror 24 by the polygonal mirror 23, whence it is reflected onto the plane mirror 25 and scanned across the workpiece 1. As in the previously described optical system, the direction of the axis of rotation 26 of the mirror 23 is variable, and the necessary forward component of velocity of the scan of the line focus 26 of the beam across the moving workpiece 1 is obtained by rotating a frame 28 which carries the rotating mirror 22 about an axis 29 which is perpendicular to the axis of rotation of the mirror 23, by the angle $\phi$ relative to the longitudinal axis of the cylindrical mirror 21.

The stacking angles $\alpha$ and $\beta$ between the normal and the input beam 20 at the surface of the mirror 23, and the normal and the scanning plane at the surface of the mirror 24, respectively, introduce aberrations which manifest themselves as curvatures of the scanning path across the workpiece 27. The errors can be made to cancel each other out by an appropriate selection of the angles $\alpha$ and $\beta$ in any given case.

Figure 5:
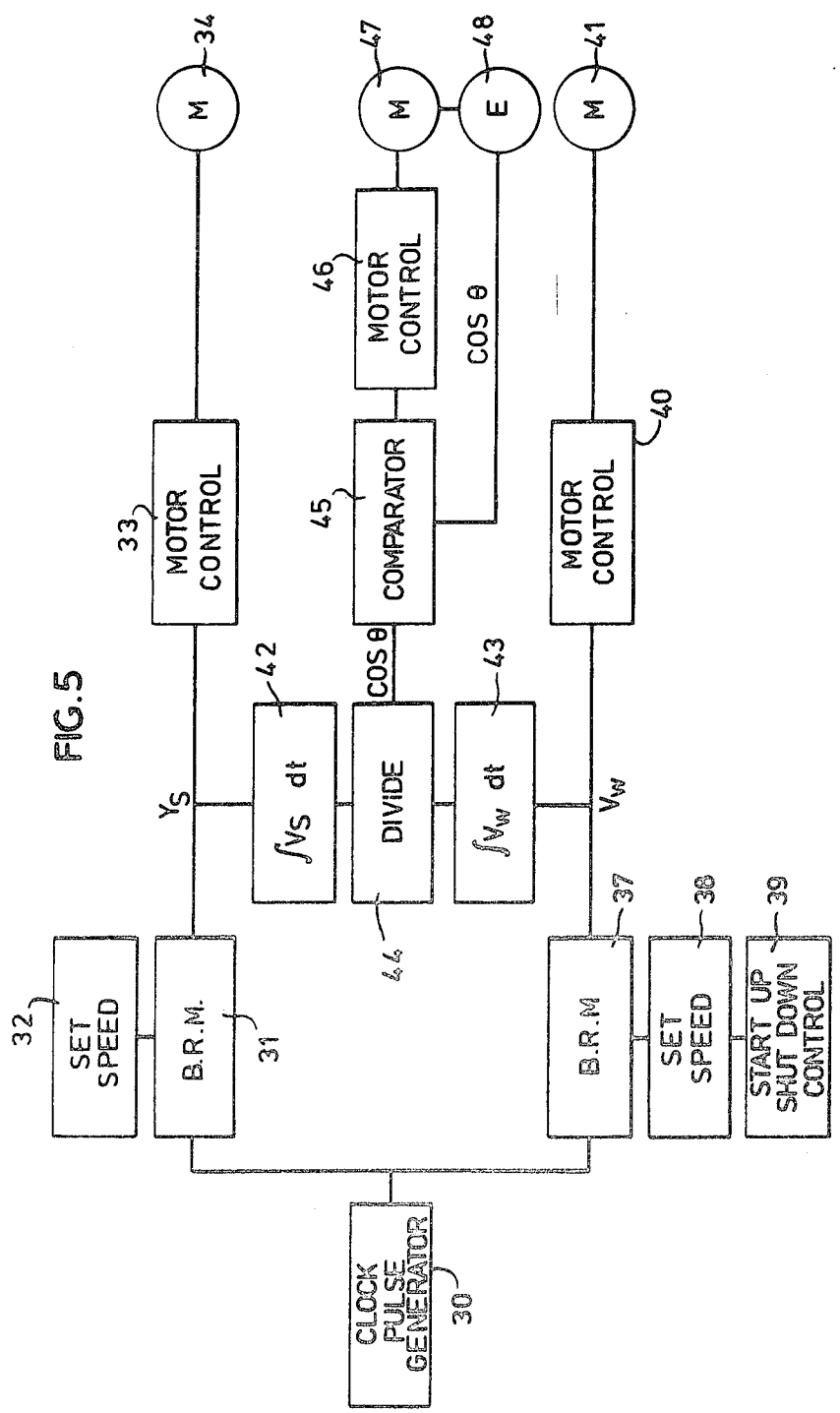
FIG. 5 is a block circuit diagram of a control system for use in an embodiment of the invention.

In the optical systems described with reference to FIG. 3 and FIG. 4 the orientation $\phi$ of the deflecting mirrors 13 or 23 relative to the axis of the cylindrical lens 11 (FIG. 3) or cylindrical mirror 22 (FIG. 4) respectively must be adjusted so as to scan at the appropriate skew angle $\theta$. Generally the magnitude of $\theta$ is the same as the magnitude of $\theta$ and related to the workpiece and scanning velocity as shown in FIG. 1. For a fixed scanning speed, in order to allow for variations of workpiece speed, for example during starting up and stopping a continuous process, it is necessary to incorporate a control system which will continuously monitor and set the skew angle $\theta$ to the appropriate magnitude. FIG. 5 illustrates one way in which this might be done with either of the optical systems described in FIG. 3 or FIG. 4.

Referring to FIG. 5, a clock pulse generator 30 produces a train of control pulses which are applied to a binary rate multiplier 31 which multiplies the control pulse rate by a factor determined by a set speed control 32. The resulting pulse train is then applied to a control unit 33 so as to control the speed of a scan drive motor 34. A similar arrangement of components 37, 38 and 40 are used to control the speed of a workpiece movement drive motor 41. (An additional device 39 may be added to the workpiece control drive to control the acceleration rate during the start-up procedure and the deceleration rate during the stopping procedure when the system is used in a continuous processing plant). The output of the multipliers 31, 37 are pulse trains the frequencies of which correspond with the scanning velocity $v_s$ and the workpiece velocity $v_w$. The respective pulse trains are integrated by two counters 42 and 43, and mathematically divided by a dividing circuit 44 to produce a signal representative of the cosine of the skew angle θ. The output of the unit 44 is compared in a comparator 45 with a signal representative of the actual position of the skewing drive as measured by a shaft encoder 48 which is graduated according to a cosine scale. A difference signal (i.e. the error in angular position) is applied to a controller 46 to drive a motor 47 in a direction which cancels the error.

Figure 6:
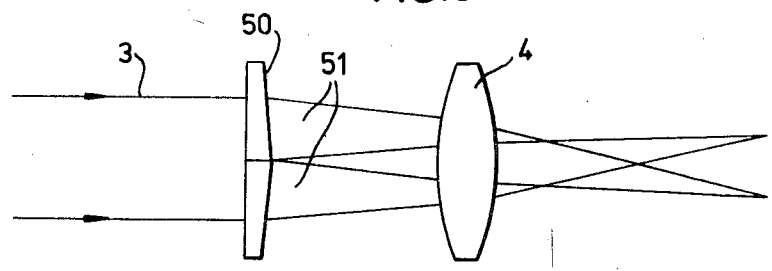
FIGS. 6 & 7 show how two line foci can be achieved for use in performing the invention.
Figure 7:
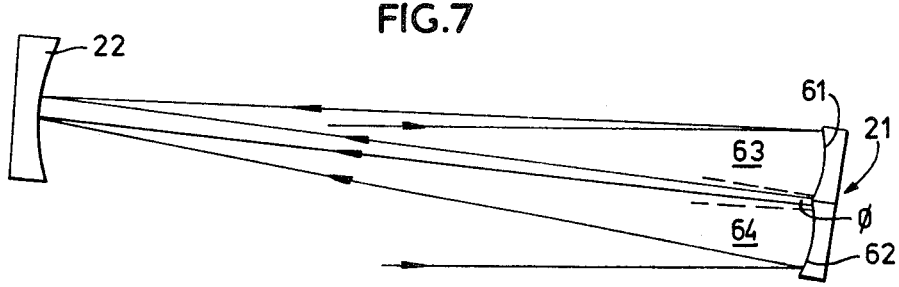

The optical systems described above can be modified to produce two, or even three line foci if they should be required. In the lens system described with reference to FIG. 3, the desired two line foci can be produced by placing a Fresnel biprism 50 in the path of the beam proceeding from the beam expander before it is incident on the cylindrical lens 11, as shown in FIG. 6. The biprism 50 can be made with its two halves separate so that the separation of the two halves of the split beam 51 can be varied. In the mirror system described with reference to FIG. 4, the desired two line foci can be produced by placing two plane mirrors inclined at an angle to each other in the path of the light beam proceeding from the beam expander or by splitting the cylindrical mirror 21 axially and positioning the two halves 61, 62 so that the normals to them, 63 and 64 respectively, are co-planar but at an angle, relative to each other as shown in FIG. 5. As in the case of the biprism, the two parts 61, 62 of the mirror 21 can be made adjustable to vary the separation of the halves of the split beam.

Figure 8:
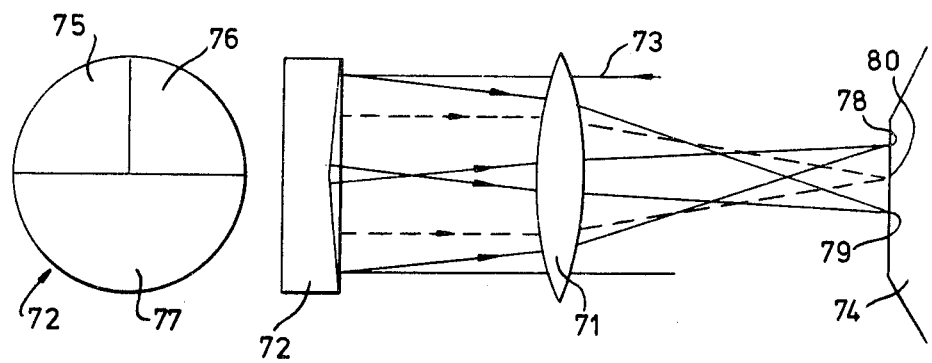
FIG. 8 shows how three line foci can be achieved for use in performing the invention.

Three line foci can be produced by the arrangement shown in FIG. 8 which can be used in both the lens and mirror forms of the system. In either system the cylindrical focusing element is a cylindrical lens 71, and a circular plane mirror 72 having three facets is positioned to receive the incident beam 73 from the beam expander (not shown) and reflect it upon the lens 71 which brings the beam to a focus on the rotating polygonal mirror 74 as before. Two of the facets of the mirror 72, facets 75 and 76 respectively, are quadrants of a circle and the third facet 77 is a semi-circle. Movement of the mirror 72 with respect to the incident beam 73 in a direction normal to the junction of the facets 75 and 76 will vary the distribution of power between the outer line foci 78 and 79 of the beam whereas movement of the mirror 72 with respect to the incident beam 73 parallel to the junction of the facets 75 and 76 will alter the distribution of power between the outer line foci 78 and 79 and the central line focus 80. Thus, for example, when using two plies of thin plastics material such as that used in the manufacture of bags for the packaging industry, one can arrange that the power distribution is such that the central line focus 80 will cut the workpiece material whereas the outer line foci will have sufficient energy to weld it only. This is particularly advantageous if bags are to be made out of a flat tube of plastics material.

We claim:

1. An optical system for scanning a beam of radiant energy across a moving workpiece to be acted upon by the radiant energy, said system comprising a cylindrical mirror arranged to bring the beam of radiation to an initial line focus, a polygonal mirror mounted for rotation about an axis, the orientation of which relative to the longitudinal axis of the cylindrical mirror can be varied, and arranged to scan the beam of radiation across a spherical mirror which is positioned to reform the image of the line focus of the beam of radiation on the workpiece, and means for varying the orientation of the axis of the polygonal mirror as a function of the rate of scan of the beam of radiation across the workpiece and the velocity of the workpiece so that the line-focused image is perpendicular to the direction of motion of the workpiece and traverses the workpiece in a straight line in the direction of the line focus.

2. An optical system according to claim 1, further including means for bringing the beam of radiation to more than one line focus.

3. An optical system according to claim 2, wherein the means for bringing the beam of radiation to more than one line focus comprises a Fresnel biprism.

4. An optical system according to claim 2 wherein the means for bringing the beam of radiation to more than one line focus comprises two plane mirrors arranged to produce two beams of radiation from a single input beam of radiation.

5. An optical system according to claim 1, further including means for producing a first control signal representative of the rate of scan of the beam of radiation across the workpiece, means for generating a second control signal representative of the velocity of the workpiece, means for producing from the two control signals a third signal representative of the value of cos θ where θ is the skew angle between the direction of scan of the beam of radiation across the workpiece and the direction of motion of the workpiece required to cause the line focus of the beam of radiation to traverse the workpiece in a straight line perpendicular to the direction of motion of the workpiece, and means responsive to the third signal for appropriately altering the orientation angle φ between the longitudinal axis of the cylindrical mirror and the axis about which the scanning mirror is moved so as to generate the required skew angle θ between the direction of scan of the beam of radiation across the workpiece and the direction of motion of the workpiece.

6. An optical system according to claim 5, including means for deriving a signal indicative of the actual value of cos θ, means for comparing the actual and required values of cos θ, and producing an error signal should any discrepancy occur between the actual and required values of cos θ, and means for altering the orientation angle φ of the axis of motion of the scanning mirror to cancel the said discrepancy.

* * * * *